March 7, 1961 D. E. MILLER ET AL 2,973,724
FREIGHT SUPPORTING AND RESTRAINING SYSTEM FOR VEHICLES
Filed Aug. 21, 1958 4 Sheets-Sheet 1
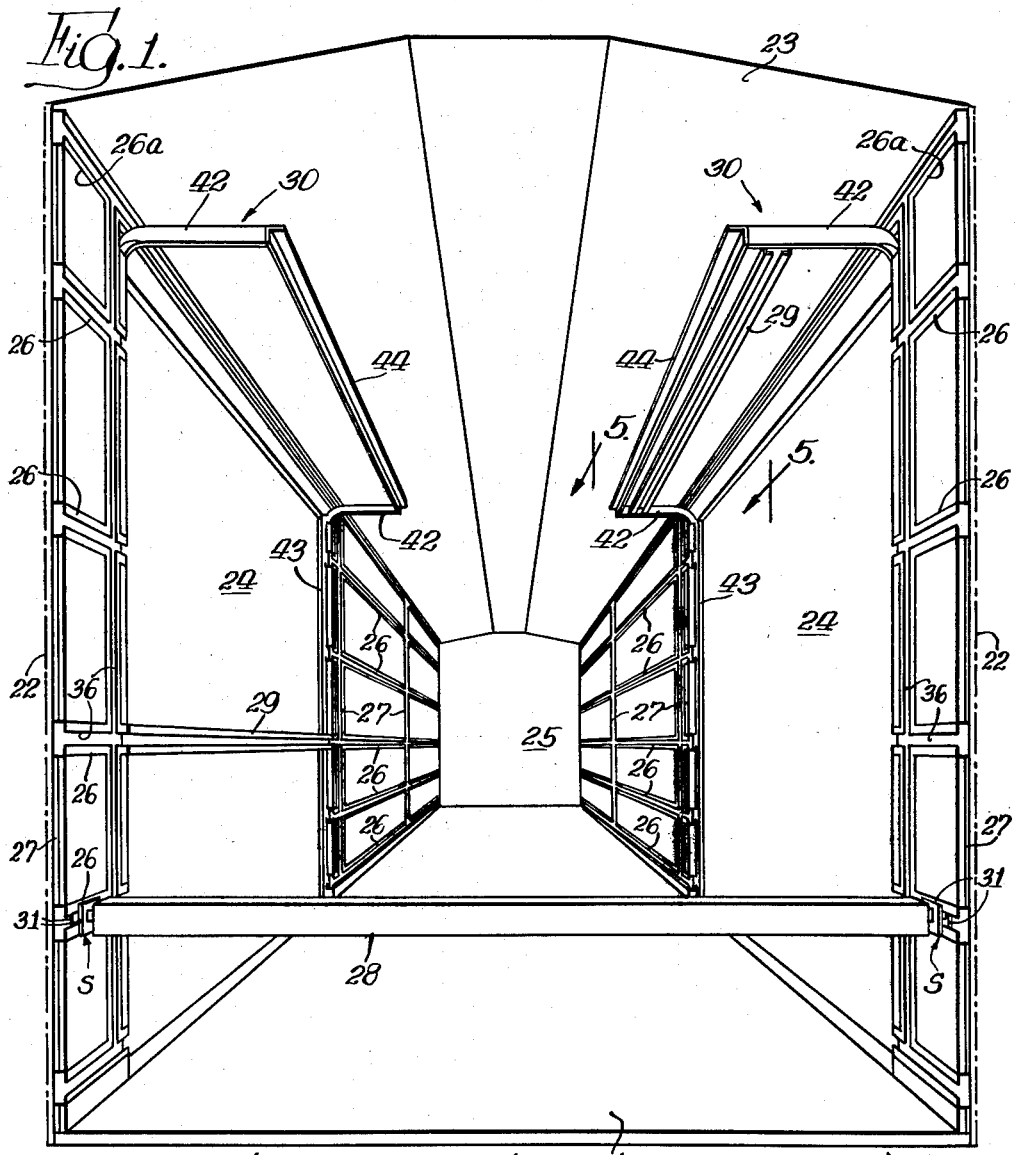
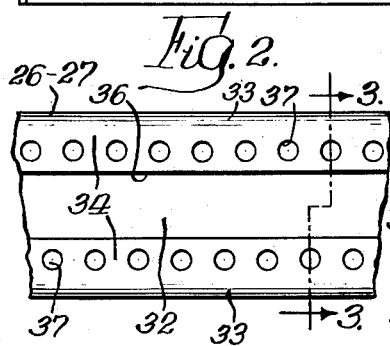
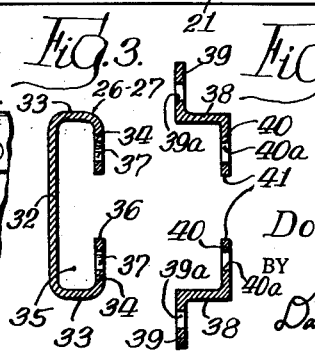
INVENTORS.
Donald E. Miller,
Edmund Frank,
BY
Davis, Lindsey, Hibben & Noyes
Attys.

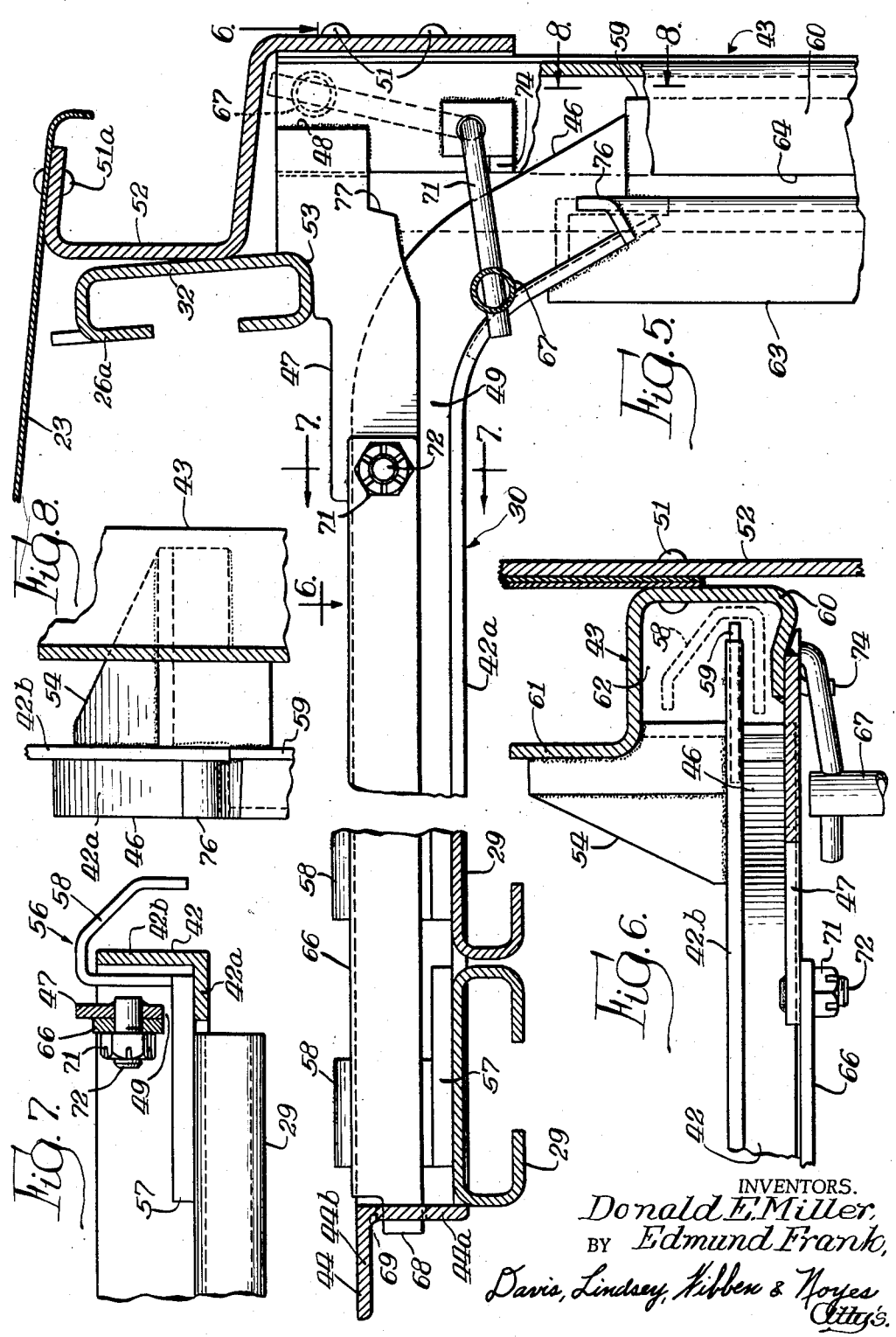

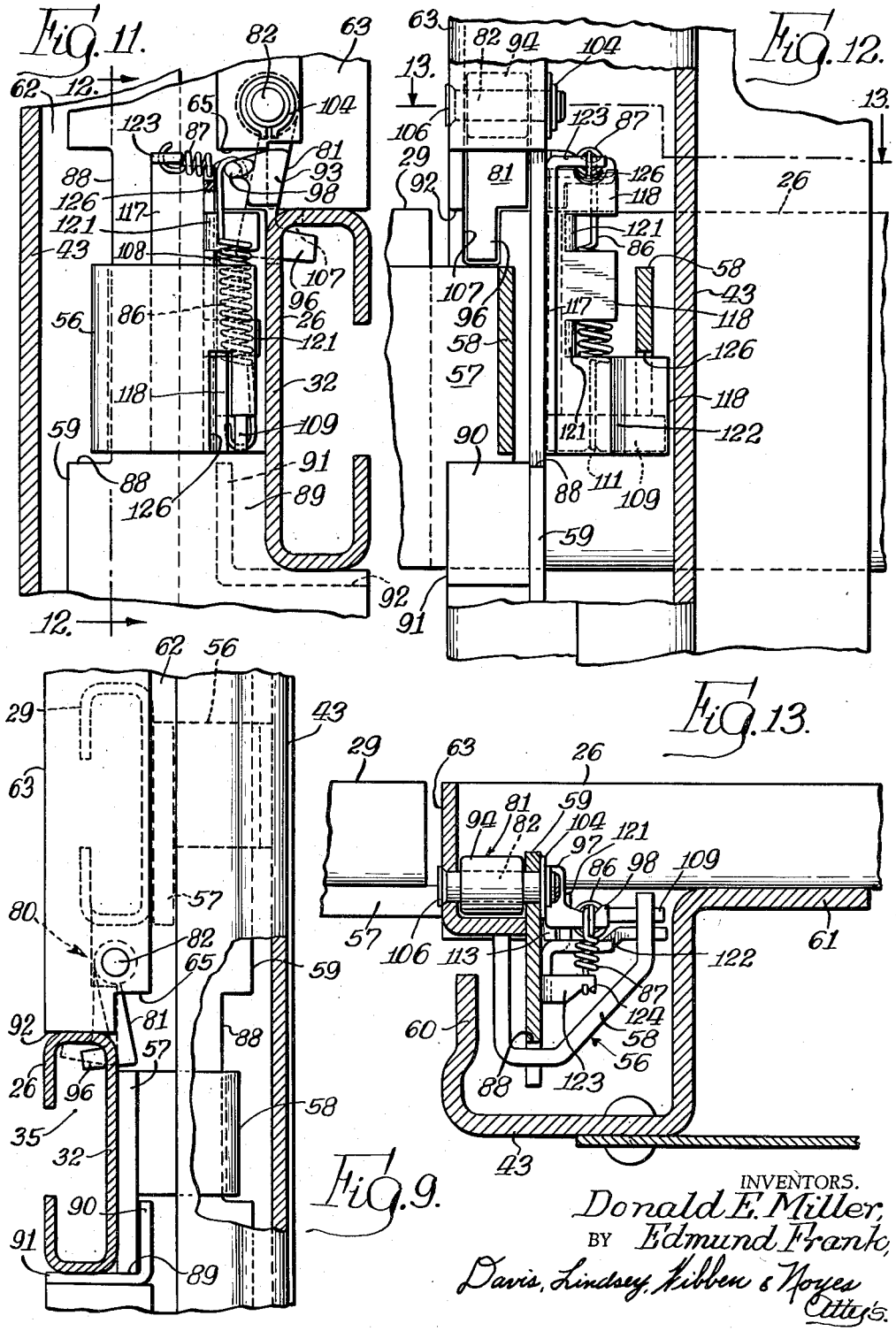

March 7, 1961  D. E. MILLER ET AL  2,973,724
FREIGHT SUPPORTING AND RESTRAINING SYSTEM FOR VEHICLES
Filed Aug. 21, 1958  4 Sheets-Sheet 4
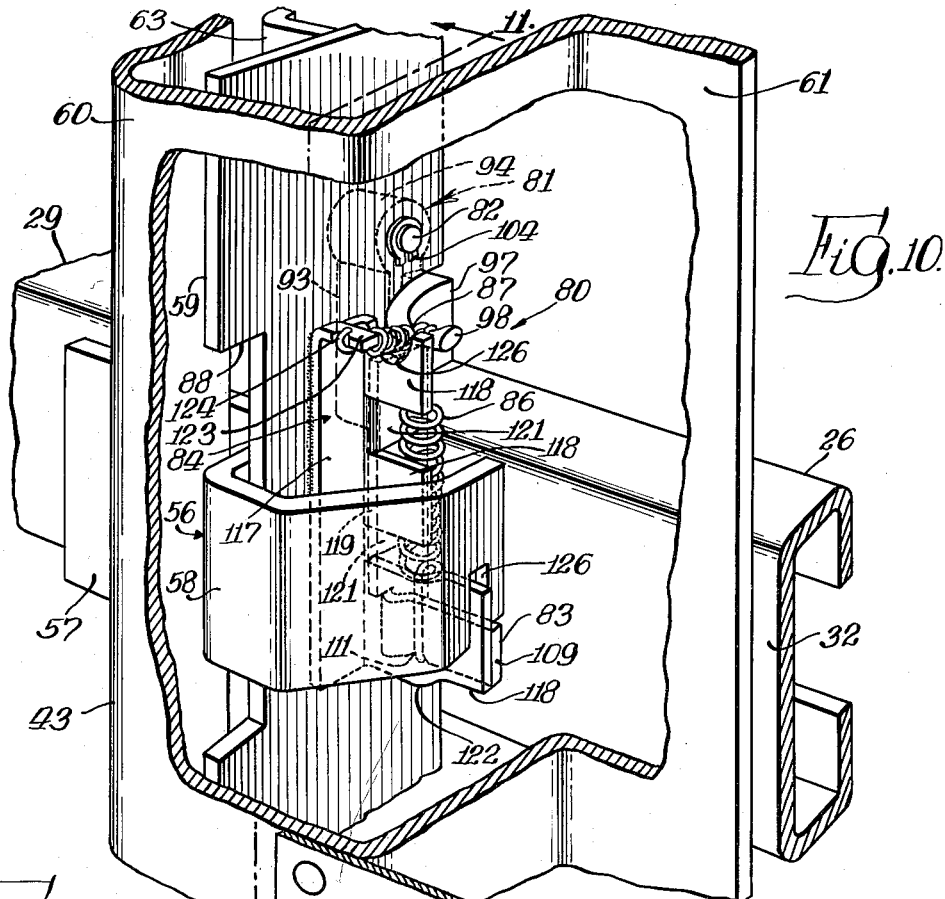
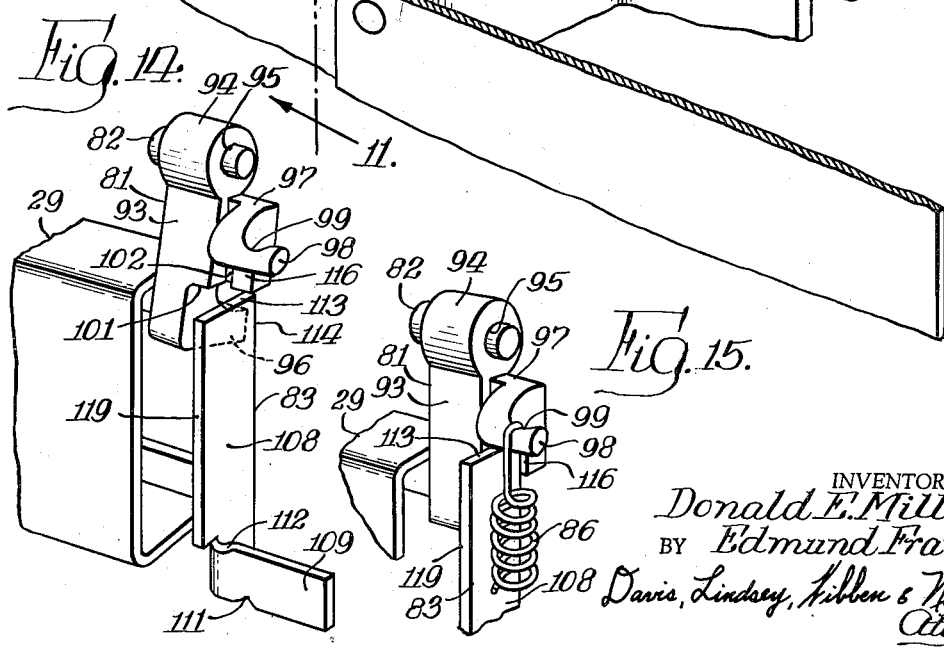
INVENTORS.
Donald E. Miller,
BY Edmund Frank,
Davis, Lindsey, Hibben & Noyes
Atty's.

United States Patent Office 2,973,724
Patented Mar. 7, 1961

2,973,724

FREIGHT SUPPORTING AND RESTRAINING SYSTEM FOR VEHICLES

Donald E. Miller, Mount Prospect, and Edmund Frank, Chicago, Ill., assignors, by mesne assignments, of one-fourth to The Atchison, Topeka & Santa Fe Railway Company, a corporation of Kansas, one-fourth to The New York Central Railroad Company, a corporation of New York, one-fourth to The Pennsylvania Railroad Company, a corporation of Pennsylvania, and one-fourth to Union Pacific Railroad Company, a corporation of Utah Filed Aug. 21, 1958, Ser. No. 756,350

24 Claims. (Cl. 105—369)

This invention relates to a freight supporting and restraining system and apparatus and more particularly relates to an improved freight supporting and restraining system for holding articles of freight or lading in the freight chamber of a vehicle.

In the past, various freight restraining and supporting systems and apparatus have been proposed for preventing articles of freight or lading from shifting during shipment. Such systems, while proving generally satisfactory as to their primary freight supporting and restraining functions, have been otherwise disadvantageous in that they either involved the use of a large number of loose or disconnected parts which could easily become lost, misplaced, or stolen, or were complex structures involving elaborate installation and operating techniques, or were of a type and construction which could easily be damaged. Vehicles equipped with such systems, including those which utilized removable transverse crossbars, were frequently rendered inoperative due to theft of the various parts and crossbars. The more elaborate systems requiring precise operating techniques and careful installation procedures were also frequently rendered inoperative from damage due to inept or careless handling.

Of the aforementioned considerations, the matter of theft of the various system components is a primary concern of the present invention. Inoperativeness of a freight vehicle due to theft of one or more parts of the freight supporting and restraining system is important because the cost to the operator of the vehicle is not only that of replacing the parts but also includes the loss of revenue resulting from the removal of the vehicle from service for inspection and repair and the cost of inspecting and transporting the vehicle to and from the maintenance shop.

Accordingly, it is a primary object of the present invention to provide an improved freight supporting and restraining system in which all of the components of the system are self-contained and permanently mounted in the freight chamber of the vehicle or storage space so as to be substantially theft-proof.

A general object of the present invention is to provide an improved freight supporting and restraining system which overcomes the aforementioned defects and which possesses superior operating characteristics.

Another object of the present invention is to provide an improved freight supporting and restraining system possessing a high degree of operational flexibility.

A specific object of the present invention is to provide an improved freight supporting and restraining system that is particularly adapted to permit the location and mounting of freight restraining crossbars in the area of the doorway of a freight vehicle and a permanent mounting and storage of the system components within the vehicle when not in use.

A further object of the present invention is to provide an improved freight supporting and restraining system that is rugged in construction, simple to operate, and economical to manufacture and maintain.

Many other objects and advantages will become apparent by reference to the detailed description which follows and the accompanying drawings in which:

Fig. 1 is a perspective view of the interior of a typical freight car equipped with a freight supporting and restraining system according to the principles of the present invention;

Fig. 2 is a fragmentary elevational view of a portion of a horizontal belt rail as utilized in the freight supporting and restraining system of Fig. 1;

Fig. 3 is a sectional view taken along the line 3—3 of Fig. 2;

Fig. 4 is a view similar to Fig. 3 showing an alternate belt rail cross-sectional configuration;

Fig. 5 is an enlarged fragmentary side elevational view, with some parts in section, of the edge of a doorway as seen substantially along the line 5—5 in Fig. 1;

Fig. 6 is a transverse sectional view, with some parts in elevation, taken along the line 6—6 of Fig. 5;

Fig. 7 is a fragmentary vertical sectional view taken along the line 7—7 of Fig. 5;

Fig. 8 is a fragmentary sectional view taken along the line 8—8 of Fig. 5;

Fig. 9 is a fragmentary elevational view, with some parts broken away to show underlying structure, of a doorway edge portion of the system;

Fig. 10 is a fragmentary perspective view of a so-called blocking mechanism forming part of the present invention, portions being broken away for clarity;

Fig. 11 is a vertical sectional view taken substantially along the line 11—11 of Fig. 10;

Fig. 12 is a vertical sectional view taken along the line 12—12 of Fig. 11;

Fig. 13 is a horizontal sectional view, with some parts in elevation, taken substantially along the line 13—13 of Fig. 12;

Fig. 14 is a fragmentary perspective view of some of the components of the mechanism of Fig. 10 showing one position of the parts thereof; and Fig. 15 is a view similar to Fig. 14 but showing the parts in another position.

As previously mentioned, the present invention relates to an improved freight supporting and restraining system for use in restraining freight in the freight chamber of a transporting vehicle. While the invention is particularly suited to use in railroad freight cars, it should be understood that the system is also applicable for supporting and restraining articles of freight in trucks, ships, and other freight storage chambers that are subject to acceleration or shock.

Briefly described, the freight supporting and restraining system of the present invention includes means defining an intersecting network of horizontally and vertically extending paths along an opposed pair of side walls of the freight chamber. Preferably, such means comprises a plurality of rail members which are permanently attached to the inside framing of the vehicle in which the system is installed. The horizontal rail members, or belt rails, preferably are C-shaped channels and are arranged longitudinally of the vehicle in vertically spaced relationship from floor to ceiling. Most of the belt rails extend between an end of the car and the doorway, but the uppermost horizontal belt rails extend the full length of the vehicle so as to form a storage area for one or more transversely extending freight supporting and restraining crossbars. Similarly, the vertically extending or upright rail members are arranged in horizontally spaced relationship and extend from floor to ceiling.

The C-shaped channels which constitute the preferred structure for the horizontal and vertical rail members are arranged with their web portions facing outwardly with respect to the interior of the car and have the edge portions of their flanges turned inwardly to form a pair of spaced longitudinally extending inner flanges which are parallel to the outermost webs. The inner flanges may also include a plurality of longitudinally spaced apertures or cut-outs which form connection points for the transverse crossbars of the system. The crossbars are adapted to span the width of the vehicle in a plurality of positions to engage and support articles of freight and preferably include slider type retractable pinned end connections which are entrained in the track-like network along the side walls of the vehicle and are movable therealong to any desired freight supporting and restraining position.

The slider type pinned end connections of the crossbars form no part of the present invention but are described and claimed in a copending application by Donald E. Miller, Serial No. 778,421, filed December 5, 1958, to which reference should be made for the details of the construction and operation thereof.

In order to permit the location and mounting of a crossbar in the area of the doorway, a series of specially constructed doorway rail members are provided, the doorway rail members being movable or slidable from an inoperative stored position in a rack over each doorway downwardly into a horizontal operative position spanning the doorway and continuous with the adjacent ends of an intersecting belt rail as a continuation thereof. Special hollow doorposts having guideways formed therein are utilized to channel a doorway rail member into an operative position spanning the doorway.

Each doorpost also includes mechanism for rapidly and securely locking a doorway rail member in an operative position spanning the doorway, the aforementioned mechanism also being effective to block removal of a crossbar through the otherwise open channel ends of the horizontal belt rails at their intersection with the doorway when a doorway rail member is not in spanning position thereacross.

In accordance with the primary object of the present invention, the horizontally extending belt rails and vertical rails of the system are rigidly and permanently connected to the inside framing of the vehicle, and the mounting of the transverse crossbars as well as the shiftable doorway rail members, whether the latter are in an operative or inoperative position, is such as to render them a substantially permanent fixture of the vehicle, thereby discouraging their theft.

*General arrangement of the system*

Referring first to Fig. 1, the interior of a typical freight transporting vehicle, in this instance a railroad freight car F is illustrated, the car F having a freight supporting and restraining system installed therein according to the principles of the present invention and being viewed from a point adjacent one end thereof. As seen in Fig. 1, the freight car F includes a floor 21, side walls 22, and a ceiling or roof structure 23. A pair of oppositely arranged centrally disposed doorways 24 are provided in the side walls 22 for loading and access to the interior of the car, it being understood that the freight supporting and restraining system of the present invention is also adapted for use with freight vehicles having a single doorway.

The freight supporting and restraining system of the present invention is generally disposed along the side walls 22 of the car, including the doorways 24, and extends from one end 25 of the car to the opposite end (not shown) and from the floor 21 to the ceiling or roof structure 23. The system includes means defining an intersecting network of horizontally and vertically extending paths, the latter being formed by a plurality of horizontally extending belt rail members 26 and vertically extending upright rail members 27. A plurality of horizontally disposed, transversely extending freight supporting and restraining crossbars 28 are provided which span the width of the car F and are slidably carried, by suitable means at their ends, in the intersecting path network. The vertical rail members 27 permit a transfer in the height of the crossbars 28 from one belt rail level to another. A plurality of horizontally disposed longitudinally extending doorway rail members 29 are also provided which are movable from an inoperative stored position in a rack 30 above each doorway into an operative position spanning the doorway 24 as a continuation of the belt rails 26 at each side of the doorway. The uppermost horizontal belt rails adjacent the roof structure 23 are designated generally at 26a and form a storage area for the crossbars 28 when not in use. The uppermost belt rails 26a also permit movement of the crossbars 28 from one end of the car to the other even when the doorway rails 29 are in a stored or inoperative position. Means in the form of a mechanism 80 (Fig. 10) is provided for locking a doorway rail member 29 in an operative position and for blocking passage of a crossbar out of engagement with the path network at the doorway 14, the mechanism 80 being carried by doorposts, designated at 43, and disposed adjacent the ends of the belt rail members 26 at their intersection with the doorposts 43, as will hereinafter be more fully described.

Each crossbar 28 is slidably carried and releasably securable at a desired mounting point along the path network by a suitable end connection or attachment indicated generally at S in Fig. 1. As heretofore mentioned, the details of the crossbar end connections S form no part of the present invention and it will be sufficient to point out that the horizontal belt rails 26 and vertical rails 27 permanently entrain the end attachments S of the crossbars 28 and provide means for securing the crossbars at close intervals spanning the width of the car.

Referring now to Figs. 2 and 3, the belt rails 26 and the vertical rails 27 are preferably C-shaped channels arranged with their web portions 32 disposed outwardly for connection by suitable fastening means (not shown) to the adjacent framing of the car and with their flange portions 33 disposed inwardly of the car. The remote end edges 34 of the flanges 33 are turned inwardly toward each other to impart the C-shaped configuration and to define an enclosed path or passage 35 therein having a longitudinally extending slot or opening 36 for the full length of the channel. The inturned edges 34, which form internal flanges paralleling the web 32, are perforated, preferably by a series of uniformly spaced apertures 37. It will be seen from Fig. 2 that the apertures 37 in one of the inturned edges 34 of the channeled rail members 26—27 is preferably staggered with respect to the apertures in the opposite inturned edge thereof in order to provide a greater latitude of adjustment in the positioning of a crossbar on the path network. The apertures 37 have been omitted from the belt rails 26 and vertical rails 27 in Fig. 1 for clarity.

The crossbar end connections S may include retractable and extensible pins (not shown) which are adapted to coact with the apertures 37 to provide a releasably secured mounting of a crossbar 28 at any one of a plurality of locations along the path network. As shown to some extent in Fig. 1, each crossbar end connection S may also include a pair of transversely spaced plates 31 arranged in entrained relation at opposite sides of the flanges 34. The plates 31 are also provided with apertures (not shown) for registry with the apertures 37 in the flanges 34, and it will readily be understood that by projecting the locking pins of the connection device S through the aligned apertures in the plates 31 and the flanges 34, the crossbar end may be releasably secured at any desired location along the gridwork. Although the aperture and pin arrangement offers many advantages, it is to be understood that as far as the present invention is concerned, any suitable form of crossbar end connection S may be used.

The C-shaped channel configuration of the rail members 26 and 27 is preferred because a basically flat sidewall can be obtained when timber or other paneling is applied between the belt rails 26 and the upright rails 27. In addition, the C-shaped configuration of the rail members 26 and 27 is a sturdy structural shape and has the advantage of providing a completely closed interior such that bulk lading, such as grain, cannot enter or lodge behind the freight chamber lining.

In Fig. 4, an alternate rail member construction and arrangement is illustrated, which may be utilized in place of the C-shaped channels. As will be seen from Fig. 4, the alternate rail member construction comprises two generally Z-shaped members 38 arranged in opposed complementary relation so as to have one pair of flanged edges 39 disposed outwardly and extending away from each other to permit connection to the inside car walls 22 and the other flanged edges 40 disposed inwardly of the car and extending toward each other in spaced relation. A restricted slot 41 is thus formed between the ends of the opposed inner flanges 40 which is of narrower spacing than the area enclosed by the rail members 38. The flanged edges 39 may be provided with apertures 39a for receiving screws or other fasteners, and the flanges 40 may include a plurality of apertures 40a for the same purpose as the apertures 37 in the C-shaped channel of Fig. 3.

*Storage rack, doorway rails, and door posts*

During operation of the freight car F, it frequently becomes necessary to support and restrain freight in the area of the doorway 24, and hence suitable means must be provided for receiving and mounting the transverse crossbars 28 in the area of the doorway 24. In order that the doorway be unobstructed during loading and unloading, such means must be readily movable into an operative position spanning the doorway and into an inoperative or storage position at a convenient location within the car.

Referring now to Figs. 5-8 in conjunction with Fig. 1, the details of the construction and operation of the doorway rail members 29 will now be described, including the manner in which they are moved into an operative position spanning the doorway and into an inoperative or storage position in the rack 30 above the doorway.

As best shown in Figs. 1 and 5, the doorway rail storage racks 30 are positioned immediately above each doorway opening 24 but sufficiently below the uppermost longitudinal belt rails 26a so as not to interfere with the passage or storage of the crossbars 28. A crossbar 28 can thus be moved between operative positions transversely spanning the interior of the car F on either side of the doorways 24 by movement past each doorway while supported on the uppermost belt rails 26a. Each rack 30 comprises a pair of horizontally disposed inwardly extending supports 42 connected at their outer ends to the door posts 43, the innermost ends of the supports 42 being joined by a longitudinally extending cross member 44. The outer ends of the supports 42 which are connected to the door posts 43 are curved downwardly, as at 46, to form a sloping ramp that extends partially into the hollow interior of the door posts 43. Both the supports 42 and the cross member 44 may conveniently be formed from angle stock, the supports 42 each being arranged with one leg portion 42a disposed horizontally (Fig. 7) and the other leg portion 42b extending vertically upwardly. The cross member 44 is preferably connected to the ends of the supports 42 with one leg 44a disposed in a vertical plane (Fig. 5) and the other leg 44b extending horizontally inwardly of the car.

A pair of horizontally extending plate members 47 (Fig. 5) are secured, as by welding 48, to the door posts 43 so as to project inwardly in spaced relation above the portions 42a of the supports 42 with a gap or space 49 therebetween. The upper ends of the door posts 43 are secured, as by rivets 51, to conventional side plates 52 which extend longitudinally along the upper side edges of the car and to which the roof structure 23 is also secured, as by rivets 51a. The uppermost belt rails 26a are inclined at a slight angle inwardly and the upper edges of the plate members 47 are secured thereto, as by welding 53. The belt rails 26a receive additional support from an engaged relationship of their web portions 32 with the side plates 52, and the junctures of the supports 42 with the doorposts 43 are strengthened by gusset plates 54.

As best shown in Figs. 5 and 7, the doorway rails 29 preferably have the same C-shaped cross section as the rail members 26 and 27 and are substantially equal in length to the width of the doorways 24. The inner flanged portions of the C-shaped doorway rails 29 are formed with a series of uniformly spaced apertures (not shown), similarly spaced and arranged to the apertures 37 in the rail members 26 and 27 for cooperation therewith when a doorway rail 29 is in an operative position.

Each doorway rail 29 also includes a pair of end mountings, designated generally at 56 (Fig. 7), that are adapted to be entrained in maze-like passages in the hollow door posts 43, as will hereinafter be described. Each end mounting 56 preferably comprises a plate 57 secured to the outer side face of the web portion of each channel-shaped doorway rail and extending longitudinally beyond the end of the rail for slidably supporting the latter on the lateral leg portion 42a of the adjacent angle member 42. A generally U-shaped bracket member 58 is carried at the outer end of each plate member 57 and is so positioned as to embrace the vertical leg portion 42b of the adjacent angle member 42 when a doorway rail 29 is supported in stored position on the rack 30. The size and shape of the U-shaped bracket member 58 are also such as to permit its passage into the cooperating hollow door post 43 in embracing relation around an elongated vertically extending maze strip member 59 (Figs. 5 and 6) which projects into the hollow door posts 43 and is connected at its upper end to the vertical leg or flange portion 42b of the corresponding support 42. The maze strip 59 thus forms a continuation of the flange portion 42b and is effective to guide the end mounting 56 of a doorway rail member 29 into the hollow door post 43 for movement therealong and into an operative position spanning the doorway 24.

As best seen in Fig. 6, the door posts 43 are preferably formed from elongated members having a cross-sectional configuration generally similar to the plates 52, each door post 43 thus including a U-shaped channel portion 60 and a flange portion 61 extending laterally from the edge of one of the sides of the channel portion 60. The channel portion 60 receives and encloses one of the bracket portions 58 of a doorway rail member 29 in vertically movable relationship as shown in broken lines in Fig. 6. Thus, the channel portion 60, together with the inwardly projecting maze strip 59, cooperate to define a vertical guideway or passage 62 therein having a shape generally complemental to the bracket portion 58.

Each door post 43 also includes an elongated vertically extending door post strip 63 (Figs. 5 and 9) spaced transversely inwardly of the channel portion 60 to define a continuous vertical passageway 64 therebetween. The end mountings 56 of each doorway rail extend through the passageways 64, and the outer edge of each door post strip 63 is notched, as at 65 (Fig. 9), at points corresponding to the intersection of the horizontal belt rails 26 with the doorway 24 for cooperation with the end mounting 56 for a purpose and function to be described more fully hereinafter.

Thus, the guideways or vertical passages 62 in the door posts 43 cooperate with the end mountings 56 of the doorway rails 29 to permit the latter to be shifted manually between an inoperative or stored position on the storage rack 30 (as in Figs. 5 and 7) and an operative position spanning the doorway 24 at the intersection of the horizontal belt rails 26 therewith (as in Fig. 1). In addition, the interlocking relationship between the guideways 62 and bracket portions 58 prevent removal of a doorway rail member once the end mountings 56 are entrained in the door posts 43.

In order to prevent accidental or unintentional dislodgement of a doorway rail 29 from its stored position on the rack 30 and to prevent an accidental or premature entry of a doorway rail 29 into the door post guideways 62, retaining means are provided in the form of hold-down bars 66 and a safety bar 67. As best shown in Fig. 5, the hold-down bars 66 are retained at their inner ends by means of projecting end portions 68 on the bars 66 which extend through openings 69 in the vertical leg portion 44a of the cross member 44. The outer ends of the hold-down bars 66 are secured to the plate members 47 by means of nuts 71 and threaded studs 72 which extend rigidly from the plates 47 through holes in the bars 66. Thus, the bars 66 are secured over the plate members 57 (Figs. 5 and 7) of the end mountings 56 thereby preventing accidental dislodgement of the doorway rails 29 from the rack 30 when the car is in transit. The hold-down bars 66 are of course detachable for permitting removal of the doorway rails 29 for repair or replacement, but this detachable relation is provided in a region not readily visible so as to discourage theft of the rails.

The safety bar 67 extends across the upper part of the doorway 24 and is rigidly affixed to a pair of pivot rods 71, the latter having bent end portions journaled in the outer flanges of the U-shaped channel portions 60 of the doorpost 43 (Figs. 5 and 6) adjacent the sides of the doorway 24. A rigid stop 74 is provided to limit the downward swinging movement of the safety bar 67 to a position such as to obstruct the movement of a doorway rail 29 onto the ramp portions 46 of the storage rack. It will be apparent from Fig. 5 that when the safety bar 67 is in the illustrated solid line position, a doorway rail 29 will be unable to enter the guideways 62 in the door posts 43 until the safety bar 67 has been raised to the dotted line position illustrated in Fig. 5.

Means are also provided in addition to the safety bar 67 to insure the passage of only one doorway rail member at a time into the guideways 62. Such means includes an abutment 76 (Figs. 5 and 8) secured to the horizontally flanged portion 42a of each curved ramp section 46 adjacent the junction thereof with the maze strip members 59. The abutments 76 are thus adapted to engage the lower edge of the plate member 57 to prevent a doorway rail 29 from falling into the door post guideways 62 after passing the raised safety bar 67. A doorway rail 29 must thus be lifted over the abutment 76 before entering the door post guideways 62, the bottom edges of the plates 47 being cut away, as at 77, to provide the necessary clearance.

It will thus be appreciated that the storage rack 30 is effective to retain and support one or more doorway rails 29 in a position over each doorway when not in use, the rack 30 including various safety and anti-theft features which prevent accidental or unintentional dislodgement or unintended movement of a doorway rail from the rack 30 until desired. In addition to its storage function, the rack 30 is also effective to guide the end mountings 56 of each doorway rail 29 into interfitting engagement with the guideways 62 in the door posts 43, the latter relationship providing a further safety feature in that because of the close clearance between the end mountings 56 and guideways 62, a doorway rail 29 will jam in the door posts should it become tilted from the horizontal.

*Doorway rail hold down and blocking mechanism*

Referring now more particularly to Figs. 9–15 in conjunction with Fig. 1, a mechanism 80 is provided in each door post at each belt rail location for coaction with the ends of a doorway rail 29 to lock the rail in an operative position spanning the doorway 24 to permit passage of a crossbar 28 therealong and for obstructing passage of a crossbar 28 out of engagement with a belt rail 26 at its intersection with the doorway 24 when a doorway rail 29 is not in position across the doorway.

It is to be noted in this regard that vertical movement of a doorway rail 29 in the door post guideways 62 as previously described does not in itself bring a doorway rail into an operative position in alignment with the belt rails 26 such as to permit passage of a crossbar 28 across a doorway. It is also necessary to shift the doorway rail transversely inwardly into a pocket to obtain this result, the guideways 62 being generally disposed outwardly of the path network along the side walls 22. This arrangement permits a doorway rail 29 to be lowered in the guideways 62 in the door posts 43 to a particular station without projecting beyond the plane of the inside faces of the belt rails 26 and upright rails 27. As best seen in Fig. 9, the notches 65 in the outermost edges of the door post strips 63 are provided to allow this inward shifting of the doorway rail 29 when a desired position is reached, and the maze strips 59 are likewise provided with similar notches or cut-outs 88 to receive the U-shaped bracket portions 58 of the end mountings 56. The notches 65 and 88 are dimensioned to permit movement of a doorway rail 29 and its end mountings 56 transversely inwardly and thence downwardly into a final position in alignment with the corresponding belt rails, the latter position being reached when the end mountings 56 are conjointly seated in a pair of mounting pockets 89 (Figs. 9 and 11) each defined by the flat vertical web portion 32 of an adjacent end of a belt rail 26 and the upstanding flange portion 90 of an L-shaped abutment member 91. The abutment members 91 are secured to the door post strips 63 adjacent the bases of a series of cut-outs 92 in the doorpost strips 63 which correspond to the intersecting positions of the belt rail ends with the doorway 24. The width of the pockets 89 is such as to receive the plate portions 57 of the end mountings 56 in nested relationship when a doorway rail 29 is moved downwardly to the full line position illustrated in Fig. 9.

In Fig. 10 the mechanism 80 is shown as it would appear at an intermediate phase of a doorway rail locking and crossbar passing operation. The main functional component of the mechanism 80 is a pawl member 81 pivotally carried by a longitudinally extending pin 82 mounted between the vertical extending maze strip 59 and the door post strip 63, the axis of the pin 82 being elevated and immediately above or slightly inward of the end edges of the belt rail ends 26. A latch member 83 (Fig. 14) is mounted for vertical reciprocable movement adjacent the maze strip 59 and coacts with the pawl 81 as described below. A latch guide 84 (Fig. 10) is rigidly secured to the maze strip 59 and its primary function is to position and support the latch member 83 during movement thereof. A vertically disposed latch spring 86 (Figs. 10 and 15) interconnects the pawl member 81 and the latch member 83 to bias the latter upwardly, and a generally horizontally disposed pawl spring 87 (Fig. 10) interconnects the latch guide 84 and the pawl member 81 for urging the pawl 81 to an outwardly pivoted position which permits free passage of crossbar end connections from the adjacent side wall belt rail into the doorway rail, and at the same time locks the plate portion 57 of the doorway bar end mounting 56 securely in the mounting pocket 89.

The pawl member 81 has an upright shank portion 93 with an enlarged cylindrical boss 94 at its upper end that is transversely bored, as at 95, to receive the mounting pin 82. The lower end of the shank portion 93 is formed with an angularly extending foot portion 96. The shank portion 93 also includes a laterally projecting portion 97 having an integral off-set arm 98 extending therefrom. The arm 98 is centrally grooved or recessed, as at 99, to provide an attachment point for the latch spring 86 and the pawl spring 87. The width of the foot portion 96 is somewhat less than that of the shank 93 to define a shoulder 101 on the under side of the shank portion 93 disposed adjacent the upper end of the latch 83, and a groove 102 (Fig. 14) is provided between the shank portion 93 and the laterally projecting portion 97 to permit the pawl 81 to swing outwardly into engagement with the edge of the maze strip member 59 as seen in Fig. 10. It will be understood that the pawl members 81 are right and left handed, and consequently the transverse position of the projecting boss portion 97, offset arm 98 and shoulder 101 will vary, as will the position of the foot portion 96, the latter being displaced laterally toward the doorway side of the mounting post (Fig. 12).

Each pawl 81 is mounted between the opposed vertical wall portions of the maze strip 59 and door post strip 63 by the pin 82, the latter extending through the bore 95 in the pawl 81 and being retained in a mounted position by a snap ring 104 seated in a groove at the end of the pin adjacent the maze strip 59 and by an enlarged tapered head 106 (Fig. 13) at the opposite end of the pin which bears against the outer wall of the door post strip 63. Thus, the pawl 81 is free to pivot between an inward crossbar obstructing or blocking position (illustrated in dotted lines in Fig. 9) and an outward crossbar passing position (illustrated in solid lines in Fig. 9). In the former position, the tip of the foot portion 96 extends into the interior of the adjacent belt rail 26 and is adapted to engage appropriate structure on the inner plate 31 of the slider end connection S to prevent passage of a crossbar 28, and in the latter position, the under surface of the foot portion 96 overlies and retains the plate portion 57 of the end mounting 56. The end portion of belt rail 26 is appropriately grooved, as at 107 (Fig. 12), to accommodate the pivotal movement of the pawl 81.

The latch member 83 is mounted for reciprocable sliding movement on the latch guide 84, the latter being secured to the inside face of the maze strip member 59 in a position of general transverse alignment with the cut-out 88 so as to be enclosed by the U-shaped bracket portion 58 of an end mounting 56 when a doorway rail is moved into operative position. The blocking latch 83 preferably has an L-shaped configuration (Fig. 14) and comprises an upright plate portion 108 and an arm portion 109 which extends laterally from the lower end of the plate portion 108 in a longitudinal direction. The under surface of the arm portion 109 has a groove 111 which provides a lower attachment point for the latch spring 86 (Figs. 10 and 12). The arm portion 109 is also offset outwardly as 112 (Fig. 14) to provide clearance and to maintain a vertical alignment of the latch spring 86. The latch 83 is mounted in outwardly spaced relationship from the belt rails 26 such that vertical reciprocable movement thereof is effective to bring the upper end edge 113 and the inner vertical edge 114 of the plate portion 108 into engagement with the under surface of the arm 98 and a generally vertical contacting surface 116, on the pawl 81, respectively, thereby to normally lock the pawl in an inward crossbar obstructing position (Fig. 15). To this end, the latch guide 84 is provided to maintain the aforementioned orientation and guided movements of the blocking latch 83.

As best shown in Figs. 10, 11 and 12, the latch guide 84 is an elongated vertically arranged angle member that is secured to the inside surface of the maze strip member 59 in general transverse alignment with the cut-out 88, the latch guide 84 having an upright plate portion 117 secured to the inside wall of the maze strip member 59 and a longitudinally extending flange portion 118 generally paralleling the web portion 32 of the belt rail 26. The latch 83 has an outer vertical side edge 119 which bears against the inner surface of the flange portion 118 in guided sliding relationship as the latch 83 moves between pawl engaging and disengaging positions. In order to prevent longitudinal shifting of the latch 83 relative to the latch guide 84, the flange portion 118 includes a plurality of vertically spaced longitudinal slits, the material therebetween being bent transversely inwardly to form a pair of vertically spaced struck-out fingers or arms 121 (Figs. 10 and 12) which engage the upright plate portion 108 of the latch 83 to thus maintain the longitudinal position of the latch in relation to the adjacent maze strip 59. The vertical spacing of the struck-out fingers 121 is such that the latch 83 and its arm portion 108 may reciprocate between an upper pawl engaging limit position and a lower disengaged position during a doorway rail locking and crossbar blocking operation. The remote lower edge of the flange portion 118 is offset inwardly as at 122 (Figs. 10 and 13) to accommodate passage of the latch spring 86 upon downward movement of the latch 83. In order to provide a connection point for the stationary end of the pawl spring 87, the upper end of the plate portion 117 is bent into a horizontal longitudinally extending position, as at 123 (Fig. 10), generally paralleling the offset arm 98 of the pawl 81. The end 123 is provided with a nick or groove 124 in its outer side edge generally opposite the groove 99 for receiving and mounting the pawl spring 87. The uppermost horizontal edge portion of the flanged edge 118 is cut out or recessed as at 126 (Figs. 10 and 12) to accommodate the traverse of the pawl spring 87 during pivotal movement of the pawl 81.

The pawl spring 87 is installed under a slight tension so as to normally exert an outward tension force on the arm 98 of the pawl 81 tending to rotate the latter outwardly into engagement with the latch 83. The latch spring 86 is also installed under a slight tension and is effective to normally urge the edges 113 and 114 of the latch 83 into engagement with the respective surfaces of the pawl 81 such that the latter is normally biased to a blocking position with the foot 96 thereof rotated inwardly through the groove 107 in the end of the belt rail 26 to thus occupy a portion of the interior space 35 of the channel section so as to prevent passage of a crossbar slider connection S therethrough.

The pawl 81 is released from its crossbar blocking position by movement of a crossbar end mounting 56 transversely inwardly through the notches 65 and 88 then downwardly into the pocket 89. The above-mentioned sequence of movements is effective to initially bring the inside face of the plate member 57 of the end mounting 56 into contact with the rear face of the belt rail web 32 and shank portion 93 of the pawl 81. This initial movement also brings the outer end of the U-shaped bracket portion 58 into a position overlying the horizontal projecting arm portion 109 of the latch 83 and the offset flanged edge 118 of the latch guide 84. A vertically extending slot 126 (Fig. 10) is formed in the outer end of the bracket 58 with a width and depth substantially equal to that of the lowermost flanged portion 118. Upon subsequent downward movement of the doorway rail 29 into the mounting pocket 89 the lowermost flanged portion 118 is caused to nest in the slot 126 and at the same time the lower edge of the outer extremity of the bracket member 58 engages the upper horizontal edge of the latch arm 109 (as shown in Fig. 10) to thereby depress the latch 83 against the action of the spring 86 and to release the pawl 81. The tension in the pawl spring 87 will thereupon rotate the pawl 81 outwardly to its full line position illustrated in Figs. 9 and 11 when the end mounting is fully seated in the pocket 89 and the pawl 81 will act as a hold-down on the doorway rail. At the same time the obstruction in the passage through the belt rail is removed so as to permit free movement therethrough of the slider mechanism S of a crossbar 28.

When a doorway rail 29 is in an inoperative or disengaged position at a particular belt rail intersection with the doorway 24, such as when a doorway rail is in a stored position on the rack 30, tension in the latch spring 86 acting on the offset arm 98 of the pawl 81 is effective to retain the blocking latch 83 biased upwardly into a pawl engaging limit position such that the shank portion 93 of the pawl assumes a generally vertical position and the foot portion 96 extends inwardly through the cut-out or recess 107 to obstruct the passage 35 in the interior of the belt rail 26 as seen in dotted lines in Fig. 9. In this position of the pawl, removal of a crossbar 28 through the open channel end of the belt rail is impossible as the foot portion 96 will engage and prevent passage of the slider mechanism S, thus preventing theft or unwarranted removal of the crossbars from the vehicle.

When it is necessary to retain and support freight in the vicinity of the doorway 24, it becomes necessary to utilize one or more doorway rails 29 to span a doorway 24 after a loading operation in order to permit passage and mounting of the crossbars 28 in the doorway areas. Assuming one or more doorway rails 29 have been moved from a stored position in the racks 30 by raising the safety bar 67 and shifting a doorway rail over the abutment member 76 into the guideways 62 in the door posts 43, a doorway rail 29 may then be moved into a mounted position between the ends of a particular pair of opposed belt rails 26 by means of a transversely inward and vertically downward path into the mounting pockets 89. The end mountings 56 at each end of the doorway rail cooperate with the latching and blocking means of the mechanisms 80 in the manner previously described to retain and lock a doorway rail in position and to concurrently permit passage of a freight supporting crossbar along the doorway rail as seen in full lines in Fig. 9.

When it is desired to return a doorway rail 29 to its storage position in a rack 30, or to move it to another location spanning the doorway 24, it is only necessary for an operator to manually depress the pawl 81 inwardly into the interior 35 of the end of a belt rail 26 such that the foot portion 96 of the pawl 81 clears the plate portion 57 of the end mounting 56, thereby permitting the doorway rail to be moved upwardly in the cut-outs 88 and thence outwardly into the guideways 62. The initial upward movement of the end mounting 56 permits the latch 83 to move upward under urging of the latch spring 86 to a position in which it maintains the pawl in the inward, crossbar blocking position. Thus, the removal of a doorway rail from operative position automatically reblocks the side wall belt rail.

It should be noted from the foregoing description that the actuating elements of the blocking mechanism are completely hidden from view. Moreover, as best shown in Figs. 9 and 10, the channel portion 60 of the door post, the maze strip 59, the door post strip 63, and the flanges 118 of the latch guide cooperate to impede access to the actuating elements of the mechanism should an attempt be made by unauthorized persons to force or unlock the mechanism, as with wires, strips of metal, etc., for a fraudulent purpose. It is the generally "pick resistant" character of the device which makes the system substantially "theft proof."

While only one exemplary arrangement of the freight retaining and supporting system of the present invention has been herein illustrated and described together with one embodiment of a doorway rail storage rack and mechanism for retaining a doorway rail at a particular mounted position in the car, it will be understood that variations and modifications of the construction herein disclosed may be effected without departing from the scope of the invention as set forth in the appended claims.

We claim:

1. In a freight supporting and restraining system for a freight chamber having a doorway and means on and extending along an opposed pair of side walls of said chamber defining an intersecting network of horizontally and vertically extending paths for adjustably engaging the ends of a plurality of freight holding crossbars at selected points along said paths, said horizontally extending paths terminating in open end portions at the opposite sides of the doorway, the improvement comprising at least one horizontally disposed slidable member adapted to be moved bodily between an inoperative position in said chamber and a selected operative position spanning said doorway as a continuation of a horizontally extending path across said doorway to thereby permit passage and connection of a crossbar therealong, guide means for guiding the opposite ends of said member during movement thereof between said positions, and combined retaining and blocking means cooperable with said guide means for retaining and locking said slidable member in said operative position spanning said doorway and also for blocking said open end portions and thereby preventing movement of a crossbar out of engagement with said path network at the doorway of said chamber when said slidable member is in an inoperative position.

2. In a freight supporting and restraining system for a freight chamber having a side wall with a doorway, the combination of a plurality of vertically spaced belt rails extending horizontally along the side wall of the chamber and defining a plurality of vertically spaced horizontal paths terminating in open end portions at the opposite sides of the doorway, said belt rails being constructed for adjustable engagement with the ends of freight holding crossbars adapted to extend transversely across the chamber at selected points along said paths, at least one horizontally disposed slidable doorway rail adapted to be moved bodily between an inoperative position in said chamber and a selected operative position spanning the doorway and in alignment with the open end portions of an opposite pair of said belt rails so as to form a continuous horizontally extending path across the doorway, guide means for guiding the opposite ends of said doorway rail during movement thereof between said positions, and combined retaining and blocking means disposed adjacent said open end portions of said belt rails and cooperable with said guide means for retaining said doorway rail in said operative position and also for blocking said open end portions and thereby preventing removal of a crossbar through said open end portions when said doorway rail is in said inoperative position.

3. In a freight supporting and restraining system for the freight chamber of a vehicle having a doorway and horizontally and vertically extending means carried by an opposed pair of side walls of said chamber defining an intersecting path network for adjustably engaging and releasably securing the ends of at least one transverse freight supporting crossbar in a selected one of a plurality of positions spanning said chamber, said network including a plurality of horizontal paths terminating in open end portions at the opposite sides of the doorway, the improvement comprising a pair of door posts with vertically extending guideways formed therein at opposite sides of the doorway, a horizontally disposed rail member having means at its ends adapted to be entrained in and slidably carried by said guideways to permit vertical shifting movement of said rail member bodily from an inoperative position adjacent said doorway to a selected one of a plurality of operative positions spanning said doorway as a continuation of a horizontal path thereacross, said rail member being effective when in an operative position to permit passage and the mounting of a crossbar therealong, and combined retaining and blocking means carried by said door posts and cooperable with said rail member for retaining and locking the latter in an operative position spanning said doorway and also for blocking said open end portions and thereby preventing movement of a crossbar out of engagement with said path network at said doorway when said rail member is in an inoperative position.

4. In a freight supporting and restraining system for the freight chamber of a vehicle having a doorway and horizontally and vertically extending means carried by an opposed pair of side walls of said chamber defining an intersecting path network for adjustably engaging and releasably securing a plurality of freight supporting crossbars at the end portions thereof in selected positions transversely spanning said chamber, the improvement comprising a pair of door posts with vertical guideways formed therein at opposite sides of the doorway, at least one horizontally disposed doorway rail member slidably mounted for bodily shiftable movement from an inoperative position adjacent said doorway to a selected one of a plurality of operative positions spanning said doorway as a continuation of a horizontal path thereacross, said doorway rail member having means at its ends adapted to be entrained in and slidably carried by the guideways in said door posts for channeling said doorway rail member during movement thereof between said positions, said doorway rail member being effective only when in operative position to permit passage and the mounting of a freight supporting crossbar therealong, and storage rack means disposed above said doorway in transfer relation with said guideways for storing said doorway rail member when not in use and for channeling the doorway rail member into said guideways when the doorway rail member is advanced toward an operative position.

5. A freight supporting and restraining system according to claim 4, further characterized in that said horizontally and vertically extending means which define the intersecting path network on the side walls of said freight chamber and said doorway rail member are elongated channels having a C-shaped cross-section and are arranged with their web portions disposed outwardly of the interior of said chamber.

6. In a freight supporting and restraining system for the freight chamber of a vehicle having a doorway and horizontally and vertically extending means carried by an opposed pair of side walls thereof defining a network of intersecting paths for adjustably engaging and releasably securing a plurality of freight supporting crossbars in selective operative positions transversely spanning said chamber, the improvement comprising a pair of hollow door posts with guideways formed therein at opposite sides of the doorway, at least one horizontally disposed doorway rail member slidably carried by said door posts and mounted for vertical shiftable movement from an inoperative position, including a storage position above said doorway, to a selected one of a plurality of operating positions spanning said doorway as a continuation of a horizontal path thereacross, said doorway rail member having means at its ends cooperable with the guideways in said door posts for channeling said doorway rail member during movement thereof between said positions, and means carried by said door posts cooperable with the means at the ends of said doorway rail member for locking said member in an operative position spanning said doorway and for blocking passage of a crossbar out of engagement with a horizontal path at its intersection with said doorway when a doorway rail member is in an inoperative position, said doorway rail member and said crossbars being permanently mounted in said freight chamber thereby to prevent theft thereof.

7. In a freight supporting and restraining system for the freight chamber of a vehicle having a doorway and horizontally and vertically extending means carried by an opposed pair of side walls thereof defining a network of intersecting paths for adjustably engaging and releasably securing a plurality of freight supporting crossbars at the ends thereof in selected positions transversely spanning said chamber, the improvement comprising a pair of hollow door posts with vertical guideways formed therein at opposite sides of the doorway, a plurality of horizontally disposed doorway rail members having end mountings cooperably engageable with the guideways in said door posts to permit vertical shifting movement of said members across said doorway between an inoperative position, including a storage position above said doorway, and a selected one of a plurality of operating positions spanning said doorway as a continuation of an adjacent horizontal path thereacross, means cooperable with the end mountings of said doorway rail members for locking and holding said members in an operative position to permit passage and the releasable securement of a freight supporting crossbar thereto only when a doorway rail member is in an operative position and for blocking passage of a crossbar out of engagement with a horizontal path at the intersection thereof with said doorway when a doorway rail member is in an inoperative position, means forming a storage rack above said doorway for storing said doorway rail members and for channeling the end mountings thereof into interfitting engagement with said guideways when a doorway rail member is advanced toward an operative position.

8. In a freight supporting and restraining system for the freight chamber of a vehicle having a doorway and horizontally and vertically extending means carried by an opposed pair of side walls thereof defining a network of intersecting paths for adjustably engaging and releasably securing a plurality of freight supporting crossbars at the ends thereof in selective transverse positions spanning said chamber, the improvement comprising a pair of hollow door posts with guideways formed therein at opposite sides of the doorway, a plurality of doorway rail members slidably carried by said door posts and mounted for selective shifting movement across said doorway from an inoperative position including a storage position above said doorway to selected ones of a plurality of operating positions spanning said doorway as a continuation of a horizontal path thereacross, said doorway rail members having end mountings constructed and arranged to interfit with said guideways for channeling said doorway rail members into said guideways to prevent removal therefrom, means cooperable with said end mountings for locking and retaining said doorway rail members in selective operative positions to permit passage of a crossbar therealong only when a doorway rail member is in an operative position, means for blocking passage of a crossbar out of engagement with a horizontal path at said doorway when a doorway rail member is in an inoperative position, and a storage rack communicating with said guideways in transfer relation and disposed above said doorway for storing said doorway rail members, said storage rack including means for preventing accidental dislodgment of said doorway rail members from a stored position on said rack and for directing the end mountings thereof into interfitting engagement with said guideways when a doorway rail member is advanced toward an operative position.

9. A freight supporting and restraining system according to claim 6, further characterized in that the means at the ends of said doorway rail member comprises a pair of plate members, each being secured to one end of a doorway rail member such that a portion of said plate member projects beyond the end of the rail member so as to extend into one of said door posts, and bracket members secured to the outer ends of said plate members and shaped to loosely interfit with the guideways in said door posts for guiding a doorway rail member between its respective operative and inoperative positions and for preventing removal of a doorway rail member from said guideways.

10. A freight supporting and restraining system according to claim 9, further characterized in that said guideways and said bracket members have a general U-shaped cross-sectional configuration so as to permit a complemental interlocking vertically slidable relationship therebetween, thereby to permit passage of a doorway rail member when the latter is in a horizontal position but to cause the doorway rail member to jam upon its becoming tilted from the horizontal.

11. A freight supporting and restraining system according to claim 9, further characterized in that said plate members are effective to slidably support a doorway rail during movements thereof between its respective operative and inoperative positions, and said bracket members are cooperable with said locking and blocking means to actuate the latter.

12. A freight supporting and restraining device according to claim 6, further characterized in that said door posts and said guideways are cut-out along their outer side edges in zones adjacent the juncture of a horizontal path forming means with said doorway to permit movement of a doorway rail member inwardly from an inoperative position in said guideways to an operative position spanning said doorway, said door posts also including an abutment member spaced outwardly from the juncture of a horizontal path forming means with said doorway to form a pocket for engaging the means on the ends of said doorway rail member to retain the latter in an operative position.

13. A freight supporting and restraining system according to claim 12, further characterized in that said pockets are offset transversely inwardly relative to the guideways and said door posts so that a doorway rail member must be shifted transversely into said cut-outs from an inoperative position along said guideways and then downwardly into said pockets to an operative position spanning said doorway.

14. A freight supporting and restraining system according to claim 6, further characterized in that said door posts each include a portion having a generally U-shaped cross-sectional configuration with the web portion thereof disposed outwardly from the doorway, the door post also including an elongated strip member disposed between the sides of the U-shaped portion to provide a maze-like configuration to said guideways.

15. A freight supporting and restraining system according to claim 4, further characterized in that said storage rack means comprises a pair of horizontally disposed transversely inwardly extending supports having their inner ends connected to said door posts above said doorway and having their outer ends connected by a longitudinally extending cross member, said supports being constructed and arranged to support a doorway rail member above said doorway and to provide a path registering with the guideways in said door posts at the upper ends thereof for passage of the means at the ends of said doorway rail member into interfitting engagement therewith.

16. A freight supporting and restraining system according to claim 15, further characterized in that said storage rack includes arresting means for selectively preventing or permitting free movement of a doorway rail member from a stored position on said rack toward an operative position along said guideways.

17. A freight supporting and restraining system according to claim 16, further characterized in that said arresting means comprises a stop disposed along the path formed by said supports and a pivotally mounted longitudinally disposed bar member movable between an obstructing position in the path of a doorway rail member advancing toward said guideways and a retracted position out of said path to permit movement of a doorway rail member over said stop and into said guideways.

18. A freight supporting and restraining system according to claim 15, further characterized in that said storage rack includes detachable hold-down means overlying said supports and adapted to restrain a doorway rail member carried by said supports to prevent accidental dislodgement thereof.

19. In a freight supporting and restraining system for the freight chamber of a vehicle having a doorway and horizontally and vertically extending means carried by the side walls of said chamber and defining a network of intersecting paths for adjustably engaging and releasably securing the ends of a plurality of freight supporting crossbars in selected transverse positions spanning said chamber, the improvement comprising in combination a pair of door posts with vertically extending guideways formed therein at opposite sides of the doorway, at least one vertically shiftable doorway rail member having end portions adapted to be entrained in and slidably carried by said guideways to permit vertical shifting movement of said rail member from an inoperative position to an operative position spanning said doorway as a continuation of a horizontal path thereacross, and means in each of said door posts cooperable with the end portions of said doorway rail member for releasably securing the latter in an operative position, said last-named means comprising a pivotally mounted pawl member carried by the door post and mounted for movement about an elevated axis parallel to the longitudinal axis of said horizontally extending path forming means for rotation between an inward crossbar obstructing position and an outward crossbar passing position, a latch member mounted for vertical reciprocable movement between an upper engaged position with said pawl member and a lower disengaged position, and means normally biasing said pawl member into an inward crossbar obstructing position and said latch member into an upward pawl engaging position to lock said pawl member into said obstructing position whenever a doorway rail member is in an inoperative position, said pawl member being movable outwardly and said latch member being movable downwardly upon movement of a doorway rail member toward an operative position to permit the releasable securement of a doorway rail member in an operable position spanning said doorway and the passage of a crossbar therealong.

20. In a freight supporting and restraining system for the freight chamber of a vehicle having a doorway and horizontally and vertically extending means carried by the side walls of said chamber and defining a network of intersecting paths for adjustably engaging and releasably securing the ends of a plurality of freight supporting crossbars in selected transverse positions spanning said chamber, the improvement comprising in combination a pair of door posts with vertically extending guideways formed therein at opposite sides of the doorway, at least one vertically shiftable doorway rail member having end portions adapted to be entrained in and slidably carried by said guideways to permit vertical shifting movement of said rail member from an inoperative position to an operative position spanning said doorway as a continuation of a horizontal path thereacross, and means in each of said door posts cooperable with the end portions of said doorway rail member for releasably securing the latter in an operative position, each of said end portions including a plate member secured at the associated end of said doorway rail member such that a portion of said plate member projects beyond the end of the member so as to extend into the door posts, and a generally U-shaped bracket member having an inner-flanged portion secured to the outer end of each plate member, each of said bracket members having an outer flanged portion provided with a vertical slot extending upwardly from the lower edge of the outer flanged portion, said last-named means comprising a pivotally mounted pawl member carried by the door post adjacent said doorway and mounted for movement about an elevated axis parallel to the longitudinal axis of said horizontally extending path forming means for rotation between an inward crossbar obstructing position and an outward crossbar passing position, a latch member having a vertical bearing plate portion and horizontal arm portion extending longitudinally into said guideways for engagement with the slotted remote end of the U-shaped bracket member for coaction therewith, said latch member being mounted for vertical reciprocable movement between an upper engaged position with said pawl member and a lower disengaged position, and means normally biasing said pawl member into an inward crossbar obstructing position and the bearing plate portion of said latch member into an upward pawl engaging position to lock said pawl member in said obstructing position whenever a doorway rail member is in an inoperative position, said pawl member being movable outwardly and said latch member being movable downwardly upon engagement of the slotted end of the U-shaped bracket member with the horizontally extending arm portion of said latch member to depress the latter and unlock said pawl member upon movement of a doorway rail member toward an operative position to permit passage of a crossbar therealong.

21. A freight supporting and restraining system according to claim 20, further characterized in that said pawl member includes a horizontally extending arm portion for engagement with said biasing means, and said biasing means comprises a pair of springs, one of which is connected between the arm portion of said pawl member and adjacent stationary structure on said door post, the other of which is connected between the arm portion of said pawl member and the horizontal arm portion of said latch member.

22. In a freight supporting and restraining system for a freight chamber having a side wall with a doorway, the combination of a belt rail mounted on said side wall for adjustable engagement with the end of a freight holding crossbar, said belt rail terminating in an open end portion at one side of said doorway, a doorway rail movable in said chamber between an inoperative position remote from said doorway and an operative position spanning the doorway and in alignment with said open end portion of said belt rail, and combined retaining and blocking means disposed adjacent said open end portion of said belt rail, said means including a member movable between a retaining position wherein said member coacts with said doorway rail for retaining the latter in said operative position and a blocking position wherein said member coacts with said belt rail to obstruct said open end portion thereof for preventing removal of the crossbar when said doorway rail is in said inoperative position.

23. The combination of claim 22, further characterized by the provision of means cooperable with said member for automatically moving said member from said blocking position to said retaining position in response to movement of said doorway rail to said operative position.

24. The combination of claim 22, further characterized by the provision of a releasable latch coacting with said member for holding the latter in said blocking position when said doorway rail is in said inoperative position and resilient means coacting with said member for moving said member to said retaining position when said doorway rail is in said operative position, said latch being releasable in response to movement of said doorway rail to said operative position.

References Cited in the file of this patent

UNITED STATES PATENTS

| | | |
|---|---|---|
| 1,702,169 | Norman | Feb. 12, 1929 |
| 1,819,978 | Shur | Aug. 18, 1931 |
| 2,287,852 | Zyara | June 30, 1942 |
| 2,616,375 | Nampa | Nov. 4, 1952 |